US 6,663,378 B2

(12) United States Patent
Grover et al.

(10) Patent No.: US 6,663,378 B2
(45) Date of Patent: Dec. 16, 2003

(54) APPARATUS FOR CORRECTING BOW IN A HONEYCOMB EXTRUDATE

(75) Inventors: Eugene C. Grover, Corning, NY (US); Robert B. Lubberts, Woodhull, NY (US); Richard D. Putt, deceased, late of Myrtle Beach, SC (US), by Mary D. Putt, executrix

(73) Assignee: Corning Incorporated, Corning, NY (US)

( * ) Notice: Subject to any disclaimer, the term of this patent is extended or adjusted under 35 U.S.C. 154(b) by 120 days.

(21) Appl. No.: 09/967,110

(22) Filed: Sep. 27, 2001

(65) Prior Publication Data

US 2003/0057592 A1 Mar. 27, 2003

(51) Int. Cl.[7] .......................... B29C 47/12; B29C 47/08

(52) U.S. Cl. ................... 425/192 R; 425/198; 425/199; 425/380; 425/466

(58) Field of Search .......................... 425/192 R, 376.1, 425/466, 197, 198, 199, 380

(56) References Cited

U.S. PATENT DOCUMENTS

| 4,364,888 A | * 12/1982 | Levin |
| 4,468,365 A | 8/1984 | Corbett et al. |
| 4,814,187 A | 3/1989 | Inoue et al. |
| 5,499,913 A | 3/1996 | Hagino et al. |
| 6,039,908 A | 3/2000 | Brew et al. |

FOREIGN PATENT DOCUMENTS

EP 0 380 232 8/1990

* cited by examiner

Primary Examiner—Mark Eashoo
(74) Attorney, Agent, or Firm—Anca C. Gheorghiu

(57) ABSTRACT

Apparatus and a method for extruding a honeycomb, providing correction in bowing of the extruded honeycomb structure, employs a deflector device having a base plate including an aperture aligned in a direction parallel to the extrusion axis through which the plastic material is conveyed to the die, the aperture having a varying diameter; and, a slide plate movably mounted to the base plate, the deflector device positioned upstream of the extrusion die, the degree of bow reduction depending on the diameter or width of the aperture imparting a pressure drop gradient on the flow stream entering the die.

3 Claims, 4 Drawing Sheets

APPARATUS FOR CORRECTING BOW IN A HONEYCOMB EXTRUDATE

BACKGROUND OF THE INVENTION

The present invention relates to an apparatus offering extruded honeycomb structures with improved dimensional accuracy, and more particularly to an apparatus for overcoming the problem of bow in an extrudate.

Ceramic honeycomb substrates for automotive applications are generally produced by cutting and firing individual pieces from a stream of honeycomb extrudate, or by cutting the pieces from a dried green or fired ceramic "log" of extrudate which may be of meter or greater length. To meet customer requirements for the subsequent catalyst coating and "canning" of these substrates in suitable metal enclosures, it is important that the logs and pieces cut from the logs have sides which are absolutely straight and parallel.

The production of a straight stream of extruded material is quite difficult; in most cases at least some "bowing" of the extrudate, attributable to uneven flow of material through the extrusion die, is observed. This bowing can be caused by non-uniform flow characteristics in the batch, but more commonly is due to uneven flow resistance across the face of the extrusion die. Even with careful attention to die fabrication, uneven machining resulting from facts such as progressive tool wear, misalignment of feed holes and discharge slots, and non-uniform exposure to chemical machining and/or plating electrolytes often result in at least some bowing tendency being "built in" to most honeycomb extrusion dies during manufacture.

One prior art approach to the resolution of this problem, as disclosed in U.S. Pat. No. 6,039,908 involves the use of a bow deflector which comprises two aperture plates which co-act to alter the flow of the extrudable material to the die. Each of the aperture plates are tapered, varying in thickness from one edge to the other, and each comprises apertures through its thickness aligned in a direction parallel to the extrusion axis. Each aperture plate is independently rotatable about the extrusion axis with respect to both the die and the other aperture plate. Rotating the tapered plates relative to each changes the amount of bow correction available, by increasing or decreasing the differential in total aperture length between the longest and shortest aperture sets across the bow deflector.

The end effect of inserting this device in front of the extrusion die is that the pressure and feed rate of extrudable material to each portion of the die will be inversely proportional to aperture length in the bow deflector behind that portion. This produces a flow velocity gradient across the diameter of the bow deflector in the direction of maximum taper. Given proper alignment of the bow deflector with respect to the die, the flow gradient from the deflector can theoretically counterbalance a pre-existing flow gradient from the die, resulting in an extruded log with much less bend or bow.

While this approach is sound in theory, problems have been identified in practice and include high maintenance costs from clogged and wore-down apertures causing extrudate flow impedance, and swollen webs in the extruded honeycomb structures resulting in defects and product failure. Due to the intricacy of the design of the prior art device cost is also an issue.

SUMMARY OF THE INVENTION

The present invention overcomes the problem of bow in a honeycomb extrudate through the use of a bow correction device of improved design. That design permits bow correction to be made over a relatively wide range of bowing conditions, and without any need to change bow deflectors.

In a first aspect, the invention includes improved apparatus for the extrusion of honeycomb structures which comprises, in combination, a honeycomb die of any suitable design (which need not be bow-corrected) and a bow correction device having a singular aperture which acts to alter the flow of extrudable material to the die in an exact and controllable manner.

As is conventional, the honeycomb extrusion die employed in the apparatus of the invention has an inlet face comprising a plurality of feed holes and an outlet face comprising a discharge opening. The discharge opening is configured in the conventional manner to produce an extrudate of honeycomb configuration from a flow stream of plastic material flowing downstream through the die along an extrusion axis parallel with the direction of extrusion.

The bow deflector, which is positioned in the flow stream immediately upstream of and adjacent the inlet face of the die, comprises a base having an aperture through its thickness aligned in a direction parallel to the extrusion axis, and a slide plate movably mounted to the base. The slide plate moves relative to the base plate controlling the diameter of the aperture.

Controlling the diameter of the aperture will change the amount of bow correction available, while changing the position of the slide plate relative to die the extrusion apparatus, will change the direction of the bow, such that the flow velocity gradient across the face of the feed stream exiting the deflector device and entering the extrusion die may be controlled as to both magnitude and direction.

Another aspect of the invention comprises an improved method for extruding a honeycomb structure from a plasticized powder batch material. In accordance with that method, a feed stream of the plasticized batch material is first directed along an extrusion path through an aperture in a device disposed across the feed stream. The deflector device has a flow resistance which varies across its length, thereby impressing a flow velocity or pressure drop gradient across the face of the feed stream traversing the deflector device. The result of this superimposed pressure drop is that a flow velocity gradient is developed across the face of the feed stream by passage through the deflector device. The feed stream with the flow velocity gradient is directed into and through the honeycomb extrusion die.

DETAILED DESCRIPTION OF THE PREFERRED EMBODIMENTS

Figure 1:
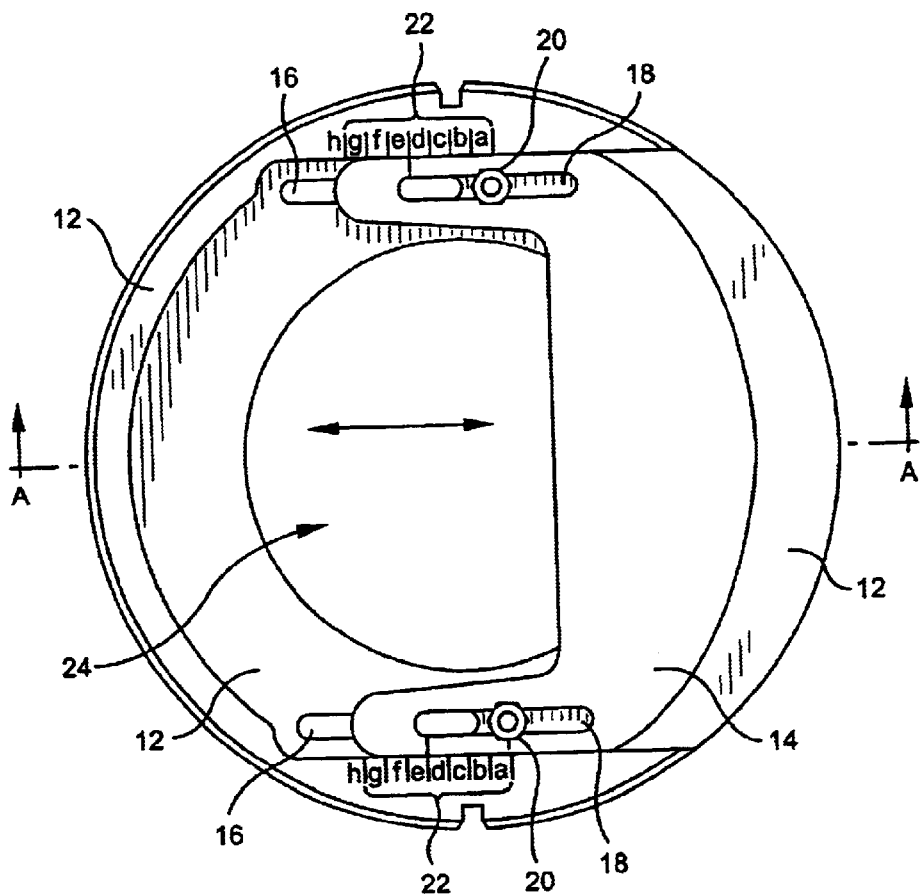
FIG. 1 is a schematic top view illustration of the components of a deflector device provided in accordance with the present invention.
Figure 2:
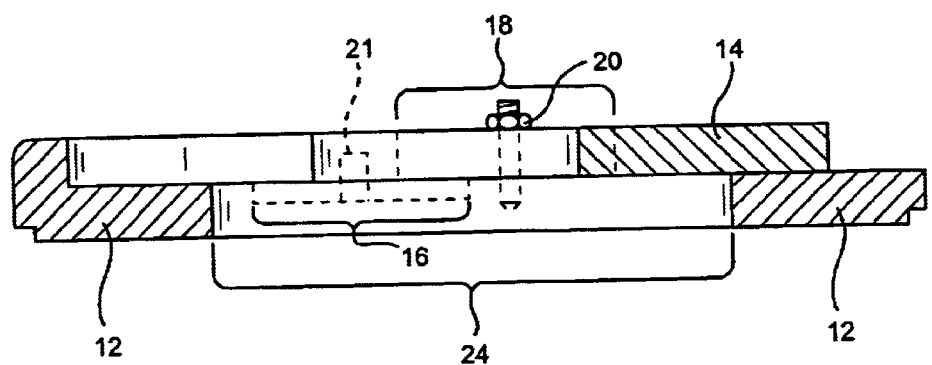
FIG. 2 is a schematic side view of section A—A through the top view of FIG. 1; and, FIGS. 3a–3b are schematic views of extrusion apparatus without extrudate bow correction and with bow correction as provided by incorporation of a deflector device as illustrated in FIGS. 1 and 2.

A preferred embodiment of the deflector device of the present invention is schematically illustrated in FIGS. 1 (top view) and 2 (side view). In both figures deflector device 10 comprises a base 12 and a slide plate 14 movably mounted to base 12. To attain movement in slide plate 14, base 12 is outfitted with a pair of elongated slots 16 which are mirrored by slots 18 on slide plate 14. Bolts 20 attach slide plate 14 to base 12, and pins 21 guide its movement. The plasticized batch or extrudate flows through aperture 24 in base 12. Aperture 24 has a varying diameter controllable by slide plate 14 which moves relative to base 12 in the direction of the arrow as shown in FIG. 1. The degree of bow correction flexibility in the design shown is dictated by aperture 24. Depending on the diameter of the aperture, the deflector device offers a flow resistance which varies across its length, which is impressed across the face of the feed stream correcting the degree of bow.

Slide plate 14 can be mounted at various set points 22 in accordance with the measured bow in the extrudate. Typically the degree of bow in an extrudate is measured from the center to ends. In FIG. 1, slide plate 14 is aligned with set points 22e, which provides an intermediate amount of bow correction. Setpoint 22a provides the minimum-correction position. Conversely, setpoint 22h provides the maximum-correction position.

Figure 3A:
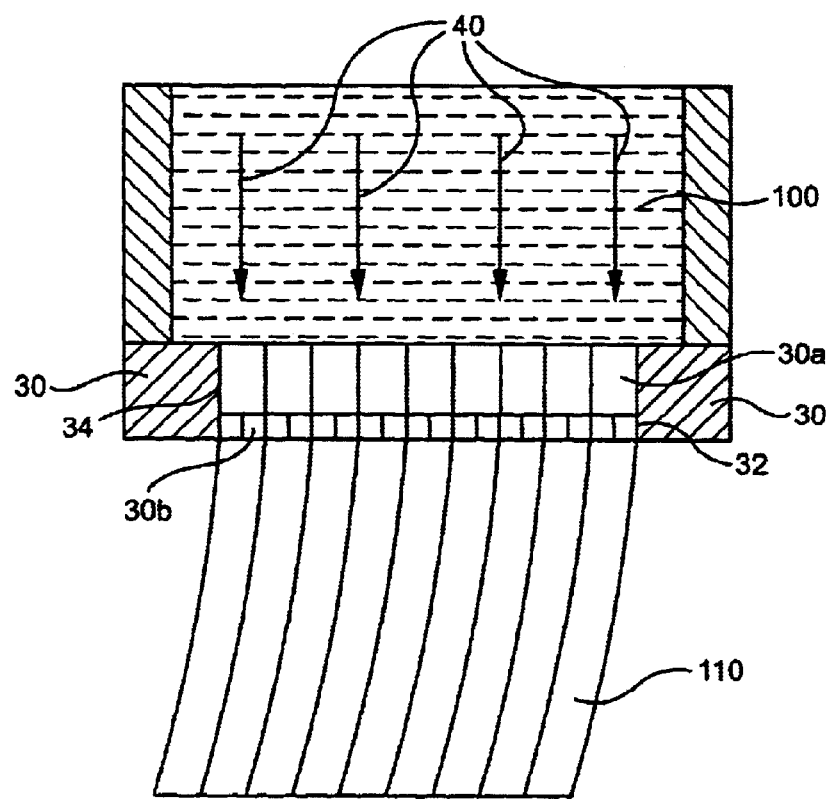
Figure 3B:
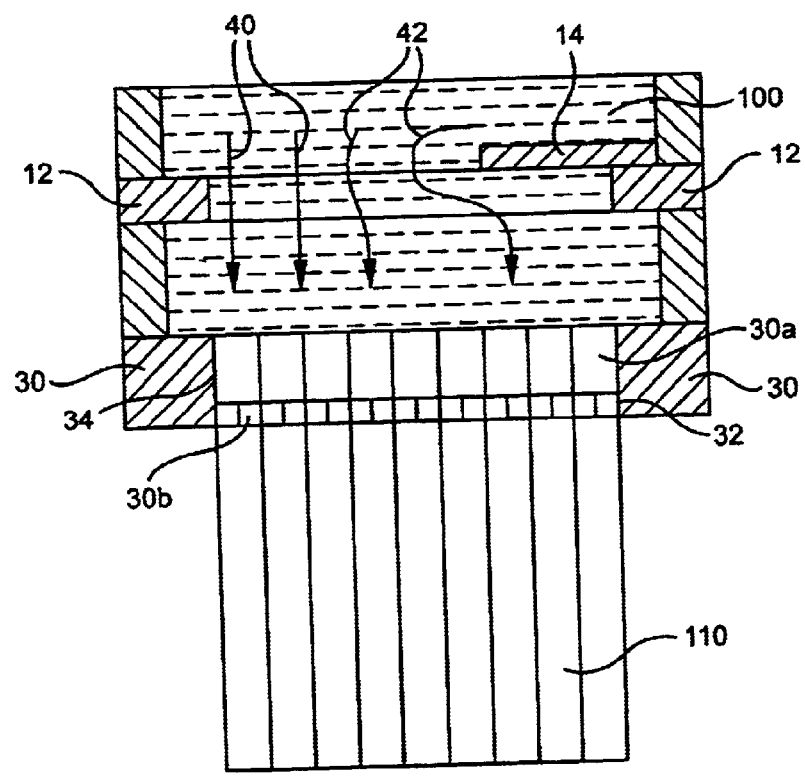

FIGS. 3a and 3b is a schematic side elevational view of extrusion apparatus incorporating a deflector device of the presently preferred type. These views are intended to illustrate the manner in which the flow velocity of a stream of plasticized batch material can be adjusted by incorporating a deflector device of the present invention.

In FIG. 3a a left bow is shown in an extrusion apparatus without a bow correction device. The plasticized batch material 100 flows into die feed holes 30a of die 30 in the direction of arrows 40 and is extruded from die discharge slots 30b. The resulting extrudate 110 is bowed to the left because batch 100 is flowing at a faster rate near die end 32, the right hand side of die 30, than die end 34, the left hand side of die 30. In FIG. 3b the bowing problem is corrected by incorporation of deflector device 10 upstream of extrusion die 30, with slide plate 14 positioned adjacent die end 32, to slow down the flow rate thereat by forcing batch 100 to flow around slide plate 14 and to follow a tortuous path as indicated by arrow 42. It is important to position slide plate 14 adjacent the die end at which the extrudate has a faster flowing rate. For example if a right bow occurred such that the extrudate flowed faster adjacent die end 32, then slide plate 14 would be positioned adjacent die end 34 of die 30. Therefore deflector device 10 is positioned in extrusion apparatus with slide plate 14 adjacent the die end opposite direction of bow in the honeycomb extrudate, such that the direction of bow in the present invention shown is dictated by the position of the slide plate, as discussed previously.

Although the deflector device is shown to be adjustable only prior to positioning in extrusion apparatus, it is contemplated that in another embodiment the device of the present invention would also be able of being adjusted for varying degrees of bow correction during the manufacturing process without interruption to production.

Advantages of the extrusion apparatus provided in accordance with the present invention include: (1) reduction of swollen webs in extruded honeycomb substrates; (2) compatible with extrusion of thin and ultra-thin honeycomb substrates; (3) reduction in preferential flow in conventional dies; (4) reduction in maintenance costs; and, (5) reduction in extrusion pressure.

What is claimed is:

1. An apparatus for the extrusion of a honeycomb structure comprising, in combination:
   a) a honeycomb extrusion die having an inlet face comprising feed holes and an outlet face comprising a discharge opening, the discharge opening being configured to form a honeycomb extrudate from a stream of plastic material flowing on an extrusion axis through the die, and,
   b) a bow deflector device positioned adjacent the inlet face of the extrusion die, the deflector device comprising:
      i) a base plate comprising an aperture aligned in a direction parallel to the extrusion axis through which the plastic material is conveyed to the die, the aperture having an adjustable diameter; and,
      ii) a slide plate movably mounted to the base plate.

2. An apparatus in accordance with claim 1 wherein the base further comprises a plurality of setpoints corresponding to positions at which the slide plate can be moved depending on the degree of bow correction required.

3. An apparatus in accordance with claim 2 wherein the deflector device is positioned with slide plate opposite direction of bow in the honeycomb extrudate flowing out of the die, to control direction of bow.

* * * * *

UNITED STATES PATENT AND TRADEMARK OFFICE
CERTIFICATE OF CORRECTION

PATENT NO. : 6,663,378 B2
DATED : December 16, 2003
INVENTOR(S) : Grover et al.

It is certified that error appears in the above-identified patent and that said Letters Patent is hereby corrected as shown below:

<u>Title page,</u>
Item [75], "Mary D. Putt, executrix" should be -- Mary Ann Putt, executrix --

Signed and Sealed this

Twenty-third Day of March, 2004

JON W. DUDAS
*Acting Director of the United States Patent and Trademark Office*